(12) United States Patent
Attarwala et al.

(10) Patent No.: US 9,051,492 B2
(45) Date of Patent: Jun. 9, 2015

(54) PRIMER COMPOSITIONS TO TOUGHEN ADHESIVE BONDS

(75) Inventors: Shabbir Attarwala, Simsbury, CT (US); Ifeanyi Chris Broderick, East Hampton, CT (US); Prakash S. Patel, Algonquin, IL (US)

(73) Assignee: Henkel IP & Holding GmbH, Duesseldorf (DE)

(*) Notice: Subject to any disclaimer, the term of this patent is extended or adjusted under 35 U.S.C. 154(b) by 458 days.

(21) Appl. No.: 13/429,729

(22) Filed: Mar. 26, 2012

(65) Prior Publication Data

US 2012/0180950 A1  Jul. 19, 2012

Related U.S. Application Data

(63) Continuation of application No. PCT/US2010/052627, filed on Oct. 14, 2010.

(60) Provisional application No. 61/252,425, filed on Oct. 16, 2009.

(51) Int. Cl.
  *B32B 37/12* (2006.01)
  *C09J 4/00* (2006.01)
  *C09J 5/04* (2006.01)

(52) U.S. Cl.
  CPC ..... *C09J 4/00* (2013.01); *C09J 5/04* (2013.01); *C09J 2400/226* (2013.01); *C09J 2433/003* (2013.01)

(58) Field of Classification Search
  USPC .................... 524/533, 575, 401, 413
  See application file for complete search history.

(56) References Cited

U.S. PATENT DOCUMENTS

| 4,440,910 A | 4/1984 | O'Connor |
| 5,340,873 A | 8/1994 | Mitry |
| 5,994,464 A | 11/1999 | Ohsawa |
| 6,225,408 B1 | 5/2001 | Huang et al. |
| 6,921,454 B2 | 7/2005 | Shi et al. |
| 7,348,385 B2 | 3/2008 | Wang et al. |
| 2008/0090069 A1 | 4/2008 | Walters |

FOREIGN PATENT DOCUMENTS

EP  1086185  5/2008

OTHER PUBLICATIONS

International Search Report issued in connection with International Patent Application No. PCT/US2010/052627 mailed Jul. 29, 2011.

*Primary Examiner* — Wenwen Cai
(74) *Attorney, Agent, or Firm* — James E. Piotrowski

(57) ABSTRACT

A primer composition including a toughening agent can be applied to a surface to be bonded using a separate curable adhesive composition. The primer composition toughens cured reaction products of the adhesive composition. In some embodiments the primer composition can also enhance reactivity of the curable adhesive composition.

21 Claims, No Drawings

PRIMER COMPOSITIONS TO TOUGHEN ADHESIVE BONDS

FIELD

This disclosure relates to a primer composition comprising a toughening agent component which can be applied to a surface to be bonded. When the treated surface is bonded to another surface using a curable adhesive the primer composition toughens the cured reaction products forming a bond between the surfaces.

BRIEF DESCRIPTION OF RELATED TECHNOLOGY

Anaerobic adhesives are mixtures of acrylic esters that remain liquid when exposed to air, but harden when confined between metal surfaces in the absence of air. Numerous industrial applications exist for anaerobic adhesives, including locking threaded fasteners, sealing threaded pipe connections, retaining cylindrical machine components, sealing porous metal castings and welds, and bonding structural and non-structural components.

Typical anaerobic adhesive formulations contain a monomer, such as a (meth)acrylate ester; a polymerization initiator, such as an organic hydroperoxide; an accelerator for catalyzing the anaerobic cure, such as benzoic sulfimide or an aromatic amine; and a stabilizer such as hydroquinone to slow premature curing.

The cured anaerobic adhesive can have substantial strength to bond substrates. However, for some applications the cured adhesive lacks desired toughness, e.g. the cured bond is strong but brittle. A variety of agents have been proposed to decrease brittleness and increase toughness of cured anaerobic adhesive compositions. These agents are homogeneously mixed into the anaerobic adhesive composition and provide a desirable increase in toughness of cured reaction products of that composition. However there are practical and commercial limits to the amount of toughening agent that can be incorporated into an anaerobic adhesive composition before properties of the composition such as viscosity are deleteriously affected.

Some types of anaerobic adhesive compositions do not cure quickly on some types of "inert" metallic surfaces, for example stainless steel or galvanized steel. However, curing of anaerobic adhesives on the inert metallic surface can be improved if the surface is previously treated with a primer composition. One type of primer composition includes an activator component and a solvent. Typically, the activator component can be one or more metallic salts that speed the cure of a later applied curable adhesive composition, e.g. the activator component allows the adhesive to more quickly and more fully cure. However these activator type primers are typically devoid of reactive components, and therefore bond properties are the result of the cured adhesive reaction products. The activator does not add strength or toughness to the bond.

U.S. Pat. No. 3,591,438 (Toback et al.) describes a primer activator composition which is used to speed the cure of a peroxy initiated acrylate based adhesive or sealant. The primer activator composition includes (a) a condensation product of an aldehyde and a primary or secondary amine, and (b) as a reducing activator, a compound containing an oxidizable transition metal. It is further disclosed to disperse or dissolve the activator compound in a volatile solvent including chlorinated hydrocarbons, such as trichloroethane or trichloromonofluoromethane, or lacquer-type solvents, such as acetone or ethyl acetate, or aromatic hydrocarbons, such as benzene or toluene.

U.S. Pat. No. 5,811,473 (Ramos et al.) describes a primer activator composition which is used to speed the cure of an anaerobically curable adhesive composition. The primer activator composition includes a transitional metal compound activator; a non-combustible, non-ozone depleting, liquid polyfluoroalkane having at least one carbon-hydrogen bond and an alkanol which is capable of forming an azeotropic mixture with the polyfluoroalkane.

A different type of primer composition includes a curable monomer component and may include a metal activator. The primer composition interacts with a contacting anaerobic adhesive to allow the adhesive to more quickly and more fully cure to form a high strength bond.

A primer composition may increase substrate adhesion however it does not add toughness to the resulting bond. In fact, cured reaction products of the primer monomer may form a brittle layer or brittle pockets within the overall bond area.

It would be desirable to provide a primer composition that when used with an adhesive increases toughness of the resulting cured composition. In some embodiments it would be desirable to provide a primer composition that also speeds the cure rate of an anaerobically curable adhesive composition.

SUMMARY OF THE DISCLOSURE

Briefly, one embodiment discloses a primer composition comprising a toughening agent component; and optionally one or more of an activator component, a co-activator component, a reactive component and a carrier component.

Briefly, one embodiment discloses a primer composition comprising a toughening agent component and a reactive component; and optionally one or more of an activator component, a co-activator component, and a carrier component.

Briefly, one embodiment discloses a primer composition comprising a toughening agent component, a reactive component, and an activator component; and optionally one or more of a co-activator component, and a carrier component.

Briefly, one embodiment discloses a non-flowable primer composition comprising a toughening agent component, a polymeric matrix, and optionally one or more of a reactive component, an activator component, a co-activator component, and a carrier component.

The primer composition is applied to a surface to be bonded to another surface by cured reaction products of a curable adhesive composition. The primer composition may be applied to the bonding surface before, simultaneously with or after the curable adhesive composition. The toughening component increases toughness of the cured reaction products of the curable composition that form the bond. Cure speed of the curable adhesive composition can be accelerated by the activator component in some embodiments.

The disclosed compounds include any and all isomers and stereoisomers. In general, the disclosed compositions may be alternately formulated to comprise, consist of, or consist essentially of, any appropriate components herein disclosed. The disclosed compositions may additionally, or alternatively, be formulated so as to be devoid, or substantially free, of any components, materials, ingredients, adjuvants or species used in the prior art compositions or that are otherwise not necessary to the achievement of the disclosed function and/or objectives.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

In one embodiment the primer composition comprises a liquid toughening agent and a metal activator.

In one embodiment the primer composition comprises a toughening agent and an activator and a diluent.

In one embodiment the primer composition comprises a toughening agent and an activator and a reactive diluent.

In one embodiment the primer composition comprises a toughening agent component; and optionally one or more of an activator component, a co-activator component, a carrier component, a reactive component, and a polymeric matrix.

The primer composition comprising a toughening agent component decreases brittleness and increases toughness of the cured bond as compared to a bond formed by cured reaction products of the same curable adhesive composition and primer composition without the toughening agent component or by the same curable adhesive composition alone.

The amount of toughening agent component can be varied to suit particular applications. The lower level will be that level which provides a desired decrease in brittleness and increase in toughness of the cured reaction products of the curable composition. The upper level of toughening agent component will be set by considerations of cost and by increase in the viscosity of the primer composition. The concentration range of toughening agent component can be from about 0.5% to about 50% or more by weight of primer composition, for example from about 1% to about 40 percent by weight of primer composition, and advantageously from about 5% to about 20% by weight of primer composition.

Examples of some useful toughening agents include elastomeric rubbers; elastomeric polymers; liquid elastomers; polyesters; acrylic rubbers; butadiene/acrylonitrile rubber; Buna rubber; polyisobutylene; polyisoprene; natural rubber; synthetic rubber such as styrene/butadiene rubber (SBR); polyurethane polymers; ethylene-vinyl acetate polymers; fluorinated rubbers; isoprene-acrylonitrile polymers; chlorosulfonated polyethylenes; homopolymers of polyvinyl acetate; block copolymers; core-shell rubber particles, and mixtures thereof. The choice of the toughening agent component will, to a large degree, dictate various properties and characteristics of the primer composition and ultimately various properties and characteristics of cured reaction products of the adhesive composition.

The form of the toughening agent will depend on the material chosen and can include particles, nanoparticles, core-shell particles having layers of different hardnesses, liquids, solutions and discrete phases.

Some useful elastomeric polymer toughening agents may be characterized as one having a tensile strength at break of greater than 1500 psi (10342 kPa), preferably greater than 2000 psi (13790 kPa), and an elongation at break of greater than 100%, preferably greater than 200%. The toughening polymer will typically, but not always, be a block copolymer, including terpolymer, with a Tg of one block segment below $-20°$ C.

It is effective to use elastomers whose molecular weight averages more than about 100,000, but any molecular weight greater than 5,000 would be expected to effect an improvement. As a principle of general guidance, the molecular weight should be high enough to produce toughening in the subsequently applied and cured composition but not so high that the curable composition is stringy and difficult to use. It is also best to choose an elastomer whose Mooney viscosity (ML(1+4)) is between 20 and about 60, and whose glass transition temperature (Tg) is 15° C. or less. These specific limitations are not absolute and various elastomers which do not fall within them may be useful.

The acrylic rubber toughening agents may be selected from a wide range of suitable materials. Most frequently these rubbers are either: (i) homopolymers of alkyl esters of acrylic acid; (ii) copolymers of another polymerizable monomer with an alkyl ester of acrylic acid or with an alkoxy ester of acrylic acid; (iii) copolymers of alkyl esters of acrylic acid with each other; (iv) copolymers of multiple alkoxy esters of acrylic acid with each other; or (v) mixtures of any of the above (i)-(iv). Other unsaturated monomers which may be copolymerized with the alkyl and alkoxy acrylic esters include dienes, reactive halogen-containing unsaturated compounds and other acrylic monomers such as acrylamides. The acrylic rubbers may also include (meth)acrylic acid esters in limited amounts, suitably copolymerized with an acrylate ester or with a lower alkene.

The block copolymer toughening agents can include, for example, an A-B-A block copolymer wherein the A block is polymerized segment of styrene, alpha-methyl styrene, t-butyl styrene, or other ring alkylated styrene, acrylonitrile, methyl methacrylate, or a mixture of some or all of the above and the B block is an elastomeric segment having a low Tg such as that derived from a conjugated diene or copolymer thereof such as butadiene or is an ethylene-propylene polymer. Commercially available examples include EUROPRENE SOL T 193A available from Enichem Elastomers Americas, Inc. and Kraton SBR block copolymer available from Kraton Polymers LLC, Houston, Tex.

The polyurethane polymer toughening agents can include, for example, materials such as the MILLATHANE polymers available from TSE Industries.

Useful the toughening agents can include, for example, elastomeric materials described in U.S. Pat. No. 3,496,250 (Czerwinski); U.S. Pat. No. 3,655,825 (Souder et al); U.S. Pat. No. 3,668,274 (Owens et al); U.S. Pat. No. 3,864,426 (Salensky); U.S. Pat. No. 4,440,910 (O'Connor) and U.S. Pat. No. 5,932,638 (Righettini et al), the contents of each of which is herein incorporated by reference. Useful commercially available toughening agents include those marketed under the tradename HYCAR, commercially available from The Lubrizol Corporation; VAMAC ethylene acrylic elastomers such as VAMAC G, VAMAC VCS, VAMAC VMX and VAMAC VCD, all commercially available from DuPont; BLENDEX BTA III F, ACRYLOID KM 680, ACRYLOID KM 653, ACRYLOID KM 611, and ACRYLOID KM 330 copolymers, all commercially available from Rohm and Haas Company, BLENDEX 101 copolymer, commercially available from Borg-Warner Corp., METABLEN C 223 copolymer, commercially available from M & T Chemicals, Inc., and KANE Ace-B copolymer, commercially available from Kaneka USA.

Liquid elastomer toughening agents can include, for example, the liquid olefinic-terminated elastomers as described in U.S. Pat. No. 4,223,115 (Zalucha et al); U.S. Pat. No. 4,452,944 (Dawdy); U.S. Pat. No. 4,769,419 (Dawdy); U.S. Pat. No. 5,641,834 (Abbey et al), U.S. Pat. No. 5,710,235 (Abbey et al) and U.S. Pat. No. 5,932,638 (Righettini et al), the content of each of which is herein incorporated by reference.

Useful the toughening agents can include, for example, a combination of low molecular weight and high molecular weight toughening agents such as described in U.S. Pat. No. 6,225,408 (Huang et al), the content of which is herein incorporated by reference.

Useful the toughening agents can include, for example, core-shell particles. Core-shell particles have layers of differing harnesses, for example a hard shell formed over a rubbery core. The core can be comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be formed predominantly from feed stocks of polybutadiene, polyacrylate, polybutadiene/acrylonitrile mixture, polyols and/or polysiloxanes or any other monomers that give a low glass transition temperature. Other rubbery polymers may also be suitably for use in the core, including polybutylacrylate or polysiloxane elastomer (e.g., polydimethylsiloxane, particularly crosslinked polydimethylsiloxane). The shell may be formed predominantly from feed stocks of (meth)acrylates (e.g., methyl methacrylate); vinyl aromatic monomers (e.g., styrene); vinyl cyanides (e.g., acrylonitrile); unsaturated acids and anhydrides (e.g., acrylic acid); (meth)acrylamides; and the like having a suitably high glass transition temperature.

The core-shell particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment the core-shell particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the primer composition or with other components of a curable composition.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

Typically, the core will comprise from about 50 to about 95 percent by weight of the core-shell particle while the shell will comprise from about 5 to about 50 percent by weight of the core-shell particle.

Typically, the core-shell particles are on the nano scale size. Core-shell particles may have a particle size distribution where at least 90% of the particles have a particle size in the range of in the range of about 3 nm to about 1,000 nm and advantageously a particle size distribution where at least 90% of the particles have a particle size in the range of 3 nm to 500 nm. The core-shell particles have an average diameter of less than about 500 nm, such as less than about 200 nm, desirably in the range of 25 to 100 nm.

Methods of preparing core-shell particle are well-known in the art and are described, for example, in U.S. Pat. Nos. 4,419,496; 4,778,851; 5,981,659; 6,111,015; 6,147,142; and 6,180,693, each of which is incorporated herein by reference in its entirety. Core-shell particles are commercially available. Some commercially available core-shell particles include CLEARSTRENGHT and DURASTRENGTH particles, available from Arkema Inc.; KM330 and KM323B, all-acrylic copolymer particles, available from Rohm and Haas; Kureha Paraloid EXL-2655 particles comprising butadiene-alkyl methacrylate-styrene copolymers, available from Kureha Chemical Industry Co.; Staphyloid AC-3355 and TR-2122 particles comprising acrylate-methacrylate copolymers, available from Takeda Chemicals Industry Co.; Paraloid EXL series particles available from Rohm & Haas Co.

Core-shell particles may be prepared as a masterbatch where the particles are dispersed in a matrix. Methods of preparing such masterbatches are described in more detail in U.S. Pat. No. 4,778,851 and U.S. Patent Publication No. 2007/0027233, each of which is incorporated herein by reference in its entirety. Generally, an aqueous mixture comprising core-shell particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired matrix, for example epoxy resin(s), and volatile substances removed by distillation or the like to provide the masterbatch. Masterbatch dispersions of core-shell particles in an epoxy resin matrix are commercially available. Some commercially available masterbatches of core-shell particles include the MX series available from Kaneka USA and GENIOPERL available from Wacker Chemie GmbH, Germany.

The primer composition will typically include an activator component. It is believed that the activator component initiates a curing reaction with a separate curable composition and speeds the rate at which the reaction products of the primer composition and curable composition cure.

Any activator component can be used provided that the activator component exhibits reactivity with the desired curable composition. Reactivity is measured by the speed of cure of the curable composition. If the speed of cure is increased in the presence of the activator component, as compared to the speed of cure of the same curable composition without the activator component, then the activator component exhibits reactivity and can be used as an activator component.

For instance, in the context of (meth)acrylate compositions curable under anaerobic conditions, the primer compound can include a transition metal-containing compound. The transition metals are those metals which have their valence electrons in a "d" subshell. Included in this group are the metals of Groups IB, IIIA, IIIB, IVA, VA, VI, VII, VIIIA of the Periodic Table of the Elements. Advantageous transition metals include copper, chromium, manganese, iron, cobalt, nickel, and molybdenum. A preferred transition metal is copper. The oxidation state of the transition metal is not particularly critical, but the presence of a lower oxidation state which can be oxidized is somewhat preferred.

The transition metal compound may be in the form of an inorganic or organometallic compound, including oxides, salts, and organometallic chelates and complexes. Suitable inorganic salts include the carbonates, sulfates, nitrates, chlorides, bromides, phosphates, and sulfides. Suitable organic salts include the alkoxides, for example, the methoxides and ethoxides, as well as the carboxylates, including the acetates, hexoates, octoates, ethylhexanoates, and naphthenates. Other suitable transition metal complexes include the acetylacetonates and the hexafluoroacetylacetonates. Some useful transition metal compounds include copper 2-ethylhexanoate, copper acetate, copper carbonate, copper naphthenate, copper octoate, copper hexoate, cupric acetylacetone, and copper hexafluoroacetylacetonate.

The transition metal compound may be a solid or a solution. Any solvent which can dissolve the transition metal compound or hold the transition metal compound in solution may be used provided that the solvent is miscible with the remaining primer components; does not significantly affect the properties of the primer mixture; and provided the solvent can be readily evaporated. Suitable solvents for dissolving the transition metal compound include alcohols, ketones, and carboxylic acids, but other suitable organic solvents may be found. Preferably, a minimum amount of solvent is used to dissolve the transition metal compound. A quantity of solution containing the transition metal compound is used which yields the desired concentration of transition metal in the primer composition. Preferably, the quantity of solution containing the transition metal compound is no more than about 5 weight percent of the total primer composition.

A beneficial solvent which can be employed to dissolve the transition metal compound is 2-ethylhexanoic acid. Even more beneficial is the use of a solution of 2-ethylhexanoic acid containing a transition metal 2-ethylhexanoate salt, most advantageously, copper 2-ethylhexanoate in 2-ethylhexanoic acid. Copper 2-ethylhexanoate can be prepared by reacting 2-ethylhexanoic acid with copper carbonate. Typical conditions include heating the copper carbonate in a three-fold molar excess of 2-ethylhexanoic acid at about 90° C. for about 2 hours.

The concentration of the transition metal (as distinguished from the transition metal compound) in the primer composition can be any concentration which provides a desired level of reactivity with the anaerobic adhesive. Generally, the concentration of the transition metal ranges from about 0.005 to about 0.50 weight percent, preferably, from about 0.01 to about 0.25 weight percent, and most preferably, from about 0.03 to about 0.10 weight percent, based on the total weight of the primer composition.

An amine activator may be employed in the primer composition. Suitable amines include, but are not limited to, amine reducing agents, primary amines represented by the formula $RNH_2$, secondary amines represented by the formula $R_2NH$, and tertiary amines represented by the formula $R_3N$, wherein each R is independently selected from alkyl, aryl, alkaryl, or aralkyl radicals, preferably, $C_{1-10}$ alkyl, $C_{6-10}$ aryl, $C_{7-15}$ alkaryl and $C_{7-15}$ aralkyl radicals. Non-limiting examples of suitable amine co-activators include tri-n-butylamine, dimethyl-p-toluidine, dimethyl-o-toluidine, diethyl-p-toluidine, 3,5-diethyl-1,2-dihydro-1-phenyl propylpyridine (PDHP) and di-2-hydroxyethyl-p-toluidine. One useful amine is tri-n-butylamine. Other activators include amides or imides (e.g., benzoic sulfimide).

The amine activator, if used, is present in an activating amount, e.g. a concentration which exhibits reactivity with the desired curable composition. Typically, the quantity of amine activator in the primer composition ranges from about 0 to about 5 weight percent, and preferably, from about 0 to about 1 weight percent. It is noted that the amine activator may exist in the primer composition in a free form, namely unbound to any other molecule, or alternatively, in a complexed form, that is, bound, for example, to the transition metal.

Other activators such as peroxy compounds, free radical promoters, free radical initiators and the like may be employed suitable to the chosen monomer and/or curable composition.

The peroxy activators useful in primer compositions intended for anaerobic curing include the hydroperoxy polymerization inhibitors and most preferably the organic hydroperoxide inhibitors having the formula ROOH, where R generally is a hydrocarbon radical containing up to about 18 carbons, desirably an alkyl, aryl or aralkyl radical containing up to about 12 carbon atoms. Typical examples of such hydroperoxides include cumene hydroperoxide, methylethylketone hydroperoxide as well as hydroperoxides formed by the oxygenation of various other hydrocarbons such as methylbutene, cetane and cyclohexane. Other peroxy activators such as hydrogen peroxide or materials such as organic peroxides or peresters which hydrolyze or decompose to form hydroperoxides may also be employed.

The peroxy activators commonly employed in anaerobic compositions typically comprise less than about 20% by weight of the composition. Desirably, however, they are employed in lower levels such as 0.1% to about 10% by weight of the total composition.

Mixtures of activators can be used provided that they are chosen to avoid premature reaction or cure.

The reactive component is a material that interacts with a curable adhesive composition to provide a curable reaction product. One useful class of materials for a reactive component are acrylates, for example the poly- and mono-functional (meth)acrylate esters. (Meth)acrylate esters include both acrylic esters and methacrylic esters. Some useful (meth)acrylic esters have the general structure $CH_2=C(R)COOR^1$, where R is H, $CH_3$, $C_2H_5$ or halogen, such as Cl, and $R^1$ is $C_{1-8}$ mono- or bicycloalkyl, a 3 to 8-membered heterocyclic radical with a maximum of two oxygen atoms in the heterocycle, H, alkyl, hydroxyalkyl or aminoalkyl where the alkyl portion is $C_{1-8}$ straight or branched carbon atom chain.

Some exemplary monofunctional polymerizable acrylate ester monomers include hydroxypropyl methacrylate, 2-hydroxyethyl methacrylate, methyl methacrylate, tetrahydrofurfuryl methacrylate, cyclohexyl methacrylate, 2-aminopropyl methacrylate and the corresponding acrylates. Some exemplary polyfunctional monomers include polyethylene glycol dimethacrylate and dipropylene glycol dimethacrylate.

Other useful acrylate materials include those which fall within the structure:

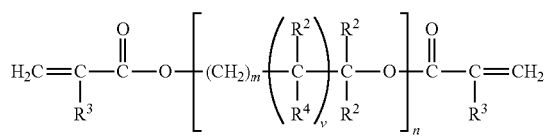

where $R^2$ may be selected from hydrogen, alkyl of 1 to about 4 carbon atoms, hydroxyalkyl of 1 to about 4 carbon atoms or

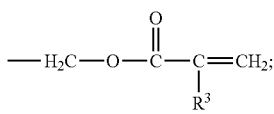

$R^3$ may be selected from hydrogen, halogen, and alkyl of 1 to about 4 carbon atoms and $C_{1-8}$ mono- or bicycloalkyl, a 3 to 8 membered heterocyclic radical with a maximum of 2 oxygen atoms in the ring;

$R^4$ may be selected from hydrogen, hydroxy and

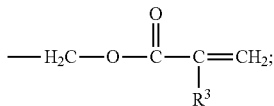

m is an integer equal to at least 1, e.g., from 1 to about 8 or higher, for instance from 1 to about 4;

n is an integer equal to at least 1, e.g., 1 to about 20 or more; and v is 0 or 1.

Other useful acrylate materials are those selected from urethane acrylates within the general structure:

where $R^5$ is H, $CH_3$, $C_2H_5$ or halogen, such as Cl; $R^6$ is (i) a $C_{1-8}$ hydroxyalkylene or aminoalkylene group, (ii) a $C_{1-6}$ alklamino-$C_{1-8}$ alkylene, a hydroxyphenylene, aminophenylene, hydroxynaphthalene or amino-naphthalene optionally substituted by a $C_{1-3}$ alkyl, $C_{1-3}$ alkylamino or di-$C_{1-3}$ alkylamino group; and $R^7$ is $C_{2-20}$ alkylene, alkenylene or cycloalkylene, $C_{6-40}$ arylene, alkarylene, aralkarylene, alkyloxyalkylene or aryloxyarylene optionally substituted by 1-4 halogen atoms or by 1-3 amino or mono- or di-$C_{1-3}$ alkylamino or $C_{1-3}$ alkoxy groups; or acrylates within the general structure:

where $R^5$, $R^6$, and $R^7$ are as given above; $R^8$ is a non-functional residue of a polyamine or a polhydric alcohol having at least n primary or secondary amino or hydroxy groups respectively; X is O or $NR^9$, where $R^9$ is H or a $C_{1-7}$ alkyl group; and n is an integer from 2 to 20.

Other useful acrylates can be selected from the class of the acrylate, methacrylate and glycidyl methacrylate esters of bisphenol A. Particularly useful are ethoxylated bisphenol-A-dimethacrylate ("EBIPMA").

Other useful acrylates include those which are exemplified but not restricted to the following materials: di-, tri-, and tetra-ethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate.

Mixtures or copolymers of any of the above-mentioned reactive components can be employed.

The reactive component need not be in the pure state, but may comprise commercial grades in which inhibitors or stabilizers, such as polyhydric phenols, quinones, and the like are included. These materials function as free radical inhibitors to prevent premature polymerization of the reactive component. It is also within the scope of the present disclosure to obtain modified characteristics for the cured composition by utilization of one or more monomers either from those listed above or additional additives such as unsaturated monomers, including unsaturated hydrocarbons and unsaturated esters.

The reactive component can be present in amounts from about 50% to about 90% by weight of the primer composition for example from about 60% to about 80% by weight of the primer composition.

A carrier component can optionally be used to lower viscosity of the primer composition. Such lower viscosity primer compositions can be advantageous for use in wicking between tightly spaced bonding surfaces having a small cure through gap therebetween. If present, the carrier is preferably a liquid that can carry the primer composition to a bonding surface and subsequently evaporate in a desirably short time.

The carrier should possess several advantageous properties. First, it should be a liquid at about atmospheric pressure and within a temperature ranging from about 15° C. (59° F.) to about 35° C. (95° F.). Second, the carrier should be non-combustible, meaning that the compound exhibits no flash point at any temperature up to about 93° C. (200° F.). Such carriers can also be described as non-flammable, because flammable compounds by definition exhibit a flash point temperature less than or equal to 38° C. (100° F.). Third, the carrier should be non-ozone depleting, by which it is meant that the compound shows an essentially zero ozone depletion potential.

Some useful carriers include one or more of water; lower alkanes such as pentane, hexane, heptane; lower alcohols such as methanol, ethanol, isopropanol; lower ketones such as acetone; halogenated compounds; glycol ethers such as n-butoxy propanol, propylene glycol monomethyl ether and 2-butoxy-1-propanol; and lower viscosity reactive monomers. Azeotropic combinations of carrier, for example as disclosed in U.S. Pat. No. 5,811,473, may also be useful. The carrier is present in an amount sufficient to dissolve or disperse the other components. Typically the carrier is present in amounts from about 10% to about 90% by weight of the primer composition.

The primer compositions can optionally be made non-flowable—i.e., they are capable of existing in a self-supporting mass without migrating at temperatures of at least 70° F. (21° C.), desirably up to about 120° F. (49° C.) and advantageously up to at least about 160° F. (71° C.). Such non-flowable primer compositions can be advantageous for use in bonding components having a large space between bonding surfaces and consequently a large cure through gap. Non-flowable primer compositions comprise a polymeric matrix. The polymeric matrix includes an organic material which generally has a melting point or softening point range in the range of about 200° F. (93° C.) to about 500° F. (260° C.), more desirably greater than 250° F. (121° C.) to about 500° F. (260° C.). Polymeric matrices are described in U.S. Pat. No. 7,408,010, the contents of which are hereby incorporated by reference. Polymeric materials useful in the present invention may be selected from urea-urethanes, hydroxy or amine modified aliphatic hydrocarbons (such as castor oil-based rheological additives), liquid polyester-amide-based rheological additives and combinations thereof. Of particular utility are polyamide materials having a melting point of about 260° F. (127° C.).

The polymeric matrix can be present in amounts of about 2.0% to about 20%, for instance about 5% to about 15%, such as about 7% to about 10%, by weight of the total composition. When present in these amounts, the non-flowability characteristics of a composition can be obtained with minimal undesirable effects, such as loss of cured product strength or cured product sealing characteristics.

Inhibitors and chelators, well recognized in the art for imparting stability to polymerizable compositions, are advantageously used in the primer composition. Those inhibitors useful in the present composition may be selected from any of the known inhibitors including those selected from hydroquinones, benzoquinones, naphthoquinones, phenanthraquinones, anthraquinones, and substituted compounds of any of these. Among the chelators which may be optionally present in the adhesive composition are the beta-diketones, ethylenediamine tetraacetic acid ("EDTA") and the sodium salt of EDTA. The inhibitors and chelators may be independently employed in levels of, for example, about 0.1 to about 1% by weight.

Thickeners, plasticizers, crosslinkers, pigments, dyes, diluents, fillers, and other agents known in the formulation of adhesives can be employed in any reasonable manner to produce known functional characteristics, providing they do not significantly interfere with the ability of the primer composition to toughen a bond. Inert fillers can be present in relatively high amounts as compared to conventional threadlocking systems. Fillers which add lubricity and sealing characteristics to the compositions, for example, TEFLON (polytetrafluoroethylene) and polyethylene, can be advantageous in some applications.

The primer composition can be prepared by simply adding the components of the composition in any order to each other and mixing well. It can be advantageous to add inhibitors and chelators prior to adding the polymeric matrix material. Typically the primer composition will be a substantially homogeneous mixture. In one embodiment the transition metal compound, as a solid or in a solution, is dissolved in at least a portion of an alkanol, and the resulting solution is used to prepare the composition. The toughening agent component can be dissolved in the carrier or other component and the resulting mixture can be used to prepare the composition. The amine co-activator, if used, may be added at any stage. Stirring and other forms of agitation are usually employed to facilitate the mixing process. The mixing is usually conducted at ambient pressure and ambient temperature, but temperatures up to about 35° C. can be useful. Generally, it is not necessary to shield the transition metal compound or the co-activator amine from oxygen during the preparation process. In another embodiment the toughening agent component is added with mixing to the reactive component. Matrix materials can be added to form a non-flowable primer composition. Solvents and carriers may not be needed in this embodiment.

In one embodiment the toughened primer composition can comprise:

| component | amount by weight |
|---|---|
| elastomeric toughening agent component | 5% to 30% |
| activator component | 0.01% to 0.2% |
| (meth)acrylate reactive component | 50% to 80% |
| optional carrier component | sufficient to reduce viscosity of the composition as desired. |
| optional polymeric matrix | sufficient to provide non-flowability characteristic to composition |

The primer composition is applied to a surface to be bonded. The primer composition may be applied to the bonding surface before, simultaneously with or after the curable adhesive composition. The primer composition can be applied to a surface to be bonded by any conventional means.

For primer compositions in liquid form the bonding surface can be dipped in a container containing the primer composition, or sprayed with the primer composition, or wiped or brushed with the primer composition. For primer compositions in non-flowable form the bonding surface can be rubbed or "crayoned" with a stick of primer composition. Non-limiting examples of bonding surface materials include metals such as aluminum, copper, magnesium, steel, zinc-plated and cadmium-plated surfaces and stainless steel. After application to the bonding surface the carrier component, if present, evaporates, leaving the other components on the treated bonding surface. Drying times in air of about 30 seconds to about 5 minutes are typical. The remaining primer components are stable and may be left on the treated bonding surface for up to about 30 days or more without affecting their ability to interact with a curable composition. Primer compositions and curable compositions are not interchangeable. Unlike a curable composition the primer composition will not cure on its own. The primer composition must interact with the curable composition for curing of the primer composition to start.

The primer can be pre-applied, e.g. applied to a surface before that surface is contacted to another bonding surface or post-applied, e.g. applied to bonding surfaces that are already in contact.

In one embodiment the primer composition is applied to a first surface to be bonded. The adhesive composition is applied to a second surface to be bonded to the first surface. The second surface is brought into contact with the first surface. Curing of the curable composition is accelerated by the activator component.

In one embodiment the primer composition is applied to a first surface to be bonded. The adhesive composition is subsequently applied to the first bonding surface over the primer composition. A second surface is brought into contact with the first surface.

In one embodiment the primer composition and the adhesive composition are applied at the same time to a first surface to be bonded. The primer composition and the adhesive composition can be applied to the first bonding surface separately or can be mixed, such as through a mix nozzle, and the mixture applied to the first bonding surface. A second surface is brought into contact with the first surface.

In one embodiment the surfaces to be bonded are brought into contact and define an interface or bondline between the contacting bonding surfaces. The primer composition and optionally the adhesive composition are applied to the interface between the contacting surfaces. Typically the primer composition will be applied adjacent the interface and will have a low viscosity suitable for wicking into the interface between the contacting surfaces.

The present toughened primer composition is useful for use with a curable composition to provide desirably toughened bonds between substrates as compared to use of that curable composition without the primer composition. The primer composition is effective for toughening bonds between metal to metal substrates and is believed effective for toughening bonds between plastic substrates to either metal or plastic substrates.

In one advantageous embodiment the first surface is a female distal joint portion of a high pressure connection and the second surface is a complementary male distal joint portion of that high pressure connection. The male distal joint portion is secured within the female distal joint portion to form the high pressure connection. High pressure connections are useful in gas compression systems and refrigeration systems, for example a refrigerator, a freezer, a refrigerator-freezer, an air conditioner, a heat pump, a residential heating, ventilation and air conditioning ("HVAC") system, a commercial HVAC system or a transportation HVAC system such as in an automobile, truck, train, airplane or boat. High pressure connections are described in more detail in U.S. application Ser. No. 12/358,798 filed on Jan. 23, 2009, the contents of which are hereby incorporated by reference in their entirety. In a pre-applied embodiment the primer composition is applied to the surface of one of the distal joint portions. A curable adhesive composition is applied to a distal joint portion surface. The adhesive may be applied to the same distal joint portion surface as the primer composition or to a surface of the complementary distal joint portion. The male distal joint portion is inserted into the female distal joint portion and the portion to bond and seal the distal joint portions together and form the high pressure connection. It may be advantageous to rotate the male portion during insertion to maximize contact between the primer composition and adhesive composition. The assembled distal joint portions may be held together for a few seconds to a few minutes to allow a partial cure of the adhesive bonding the two distal joint portions.

In a post-applied embodiment the male distal joint portion is inserted into the female distal joint portion. The primer is applied to the contacting distal joint portions and wicks there between. The adhesive composition can be applied before the distal joint portions are assembled, at the same time as the primer composition or after the primer composition is applied. The assembly may be held together for a few seconds to a few minutes to allow a partial cure of the adhesive bonding the two distal joint portions.

The amount of primer composition to be applied to the bonding surface should provide a thin film and usually no more than is necessary to obtain efficient acceleration of the bonding operation and desired toughening. Excess primer composition may affect the strength of the final bond. For most purposes it is satisfactory to use a ratio in the range of 1 part primer composition to 1 part curable composition (1:1) to 1 part primer composition to 10 parts curable composition (1:10).

The primer composition is advantageously useful with anaerobically curable acrylate or methacrylate adhesive composition. Exemplary curable adhesive compositions contemplated for use with the primer composition disclosed herein include (meth)acrylate monomers typically admixed with a peroxy initiator. These compositions remain stable and uncured in the presence of air (oxygen), but polymerize to form hard, durable reaction products when air or oxygen is removed. Such curable compositions are particularly adaptable to use as adhesives for the bonding of metals and other non-porous or non air-permeable materials. Of particular utility as adhesive materials are polymerizable di- and other polyacrylate esters. Non-limiting examples of suitable monoacrylate ester monomers include isobutyl methacrylate, cyanoethyl acrylate, hydroxyethyl methacrylate, hydroxypropyl methacrylate, and cyclohexyl acrylate. Non-limiting examples of suitable polymerizable polyacrylate esters include di-, tri-, and tetraethylene glycol dimethacrylate, dipropylene glycol dimethacrylate, polyethylene glycol dimethacrylate, as well as ethoxylated bisphenol A dimethacrylate. Also included as suitable acrylate esters are those formed by the reaction of an acrylate ester containing an active hydrogen atom in the alcoholic portion of the ester with an organic isocyanate. These and other suitable acrylate esters, including urethane acrylates, etc., and their formulations with organic peroxide polymerization initiators, stabilizers, and modifiers are more fully described in the following U.S. Pat. No. 3,591,438; U.S. Pat. No. 3,218,305; U.S. Pat. No. 4,018,851; U.S. Pat. No. 3,993,815; U.S. Pat. No. 3,925,988; and U.S. Pat. No. 4,309,526, relevant sections of which are incorporated herein by reference. Commercial anaerobically curable adhesive compositions are widely available, for example from Henkel Corporation of Rocky Hill Conn. under the LOCTITE trademark.

The following examples illustrate various aspects of the composition of this invention, including methods of making and using the composition. Unless otherwise stated, all percentages in the examples are on a weight percent basis.

The following examples are included for purposes of illustration so that the disclosure may be more readily understood and are in no way intended to limit the scope of the disclosure unless otherwise specifically indicated.

EXAMPLES

A plurality of copper and aluminum tubes were provided. Each tube was a nominal 5/16 inch diameter. Each tube had a male or female distal portion in one end. The distal portions allowed approximately 3/4 inch of lengthwise overlap and 0.002 to 0.006 inches of radial clearance when the male distal portion was inserted in the female distal portion.

A pair of tubes one having a male distal portion and the other having a female distal portion was selected. The pair could both be copper, both be aluminum or a combination of one copper and one aluminum tube. Surfaces to be bonded were cleaned with isopropyl alcohol where applicable. A thin film of adhesive composition was applied to the male distal joint portion and primer composition, if used, was applied as a thin film to the female distal joint portion. The male distal joint portion was inserted into the female distal joint portion with no rotation between portions to obtain the 3/4 inch overlap and held in place for about 30 seconds. After 30 seconds the adhesive and primer had cured sufficiently to hold the tubes in position without assistance. The bonded assembly was allowed to cure at room temperature (RT) for a specified time before being subjected to a leak test. A new bonded assembly was used for each leak test.

Initial Pressure Test:

The bonded assembly was allowed to room temperature cure for about 2 to about 10 minutes. The interior of the cured assembly was pressurized with helium gas to about 400 psi pressure. The pressurized assembly was immersed in water. Helium bubbles escaping from the bond area were noted as a failure. Typically three assemblies were tested.

High (UL 250) Pressure Test:

The bonded assembly was allowed to room temperature cure for about 2 hours. The interior of the cured assembly was placed under 2,000 psi pressure using oil and any leaks were noted as a failure. Typically three assemblies were tested.

Burst Pressure Test:

The bonded assembly was allowed to room temperature cure for about 72 hours. The interior of the cured assembly was placed under increasing pressure and any leaks were noted as a failure. Typically three assemblies were tested.

Thermal Cycle Test:

The bonded assembly was allowed to room temperature cure for 24 hours. The cured assembly was exposed to the following temperature cycle: hold at −10° F. for 1 hour, heat from −10° F. to 275° F. over 1 hour, hold at 275° F. for 1 hour, cool from 275° F. to −10° F. over 1 hour for 500 cycles. After completion of 500 cycles the bonded assembly was allowed to come to room temperature. The room temperature bonded assembly was placed under 2,000 psi pressure using oil (UL 250 test) and any leaks were noted as a failure. Typically three assemblies were tested. An Enviroflex 300 series tester from Envirotronics can be used for the thermal cycle test.

Thermal Shock Test:

The bonded assembly was allowed to room temperature cure for 24 hours. The cured assembly was exposed to the following temperature cycle: place in 0° F. cooler for 5 minutes, place in 300° F. oven for 5 minutes, placed in 0° F. cooler for 5 minutes for 500 cycles. After completion of 500 cycles the bonded assembly was allowed to come to room temperature. The room temperature bonded assembly was placed under 2,000 psi pressure using oil (UL 250 test) and any leaks were noted as a failure. Typically three assemblies were tested. A Blue M Pro Star model WSP1098MP3 test chamber can be used for the thermal shock test.

Vibration Test:

The bonded assembly was allowed to room temperature cure for 24 hours. The cured assemblies were placed in a container (beaker) secured to an oscillating mixing table. The bonded assemblies were allowed to freely move within the container. The mixing table was set for a ⅜ inch movement; 300 movements/minute. Testing was continued for 200 hours. After completion of 200 hours of testing the bonded assembly was placed under 2,000 psi pressure using oil (UL 250 test) and any leaks were noted as a failure. Typically three assemblies were tested.

Refrigerant Compatibility Test (NEMA RE2):

The bonded assembly was allowed to room temperature cure for 24 hours. One cured assembly was internally pressurized to 400 psi using one of the test refrigerants for 240 hours. The test refrigerants are R134A; R134A and a standard polyol ester refrigeration oil; R410A; and R410A and a standard polyol ester refrigeration oil. After completion of 240 hours of testing the bonded assembly was placed under 2,000 psi pressure using water (UL 250 test) and any leaks were noted. A failure under any test refrigerant was considered a failure of the refrigerant compatibility test. Typically three assemblies were tested.

Example 1

The following materials were used. All percentages are by weight. The adhesive used to bond all of the tubes is LOCTITE 640. The technical data sheet describes LOCTITE 640 as a one component, high strength acrylic adhesive that cures via an anaerobic mechanism. The technical data sheet describes LOCTITE 7387 as a low viscosity activator to promote cure of acrylic adhesives. LOCTITE 7387 is indicated to comprise solvents but is not indicated to contain a reactive component. The technical data sheet describes LOCTITE 7088 as a solvent free, wax-like semisolid primer for anaerobic curing adhesives. LOCTITE 7088 is indicated to contain a dimethacrylate ester monomer reactive component and to have an anaerobic cure mechanism. Three different materials were individually mixed with LOCTITE 7088 to provide toughened primer compositions A, B and C. Composition A comprises 10 weight percent of a mixture of 25% core/shell particles in 75% epoxy resin available from Kaneka USA under the tradename MX125 and 90 weight percent LOCTITE 7088. Composition B comprises 10 weight percent styrene-butadiene-styrene block copolymer particles available from Kraton Polymers LLC, Houston Tex. under the tradename KRATON D1155ES and 90 weight percent LOCTITE 7088. Composition C comprises 10 weight percent liquid, maleinized polybutadiene resin available from Sartomer Company, Inc., Exton Pa. under the tradename RICON 131MA10 and 90 weight percent LOCTITE 7088.

Test results are summarized in Table 1 below.

TABLE 1

| adhesive | primer | Initial test | UL250 test | Thermal Cycle test | Thermal Shock test | Vibration test | Refrigerant Compatibility test |
|---|---|---|---|---|---|---|---|
| 640[1] | none | fail | fail | — | — | — | — |
| 640 | 7387[2] | pass | fail | fail | fail | fail | fail |
| 640 | 7088[3] | pass | pass | fail | fail | pass | pass |
| 640 | A[4] | pass | pass | pass | pass | pass | pass |
| 640 | B[5] | pass | pass | pass | pass | pass | pass |
| 640 | C[6] | pass | pass | pass | pass | pass | pass |

— means not tested.
LOCTITE 640 available from Henkel Corporation, Rocky Hill, Connecticut.
LOCTITE 7387 available from Henkel Corporation, Rocky Hill, Connecticut.
LOCTITE 7088 available from Henkel Corporation, Rocky Hill, Connecticut.
A is 10 wt % Kaneka MX125 and 90 wt % LOCTITE 7088.
B is 10 wt % Kraton D1155ES and 90 wt % LOCTITE 7088.
C is 10 wt % Sartomer RICON 131MA10 and 90 wt % LOCTITE 7088.

As shown by the results in Table 1 assemblies bonded using only LOCTITE 640 adhesive did not pass either the Initial pressure test or UL 250 pressure test. Assemblies bonded using LOCTITE 640 on one portion and LOCTITE 7387 on the other portion passed the initial pressure test but did not pass the UL 250 pressure test. Assemblies bonded using LOCTITE 640 on one portion and LOCTITE 7088 on the other portion passed the initial and UL 250 pressure tests. These assemblies also passed the vibration test and refrigerant compatibility test. These assemblies did not pass either the thermal cycle or thermal shock test. Assemblies bonded using LOCTITE 640 on one portion and toughened primer compositions A, B and C passed all of the tests. The test results show that an adhesive bond between metal substrates can be toughened by using the present toughened primer composition.

Example 2

All percentages are by weight. The adhesive used to bond all of the tubes is LOCTITE 640. The major constituents of Composition D are as follows:

| | Composition D |
|---|---|
| 68% | reactive monomers |
| 16% | styrene-butadiene-styrene block copolymer particles[1] |
| 10% | unsaturated cross linker |

-continued

Composition D

| | |
|---|---|
| 2.3% | copper metal activators in solvent |
| 1.5% | silica powder |

KRATON D1155ES

The remaining constituents of composition D were present to add color or modify other properties not relevant to toughening.

Aluminum or copper tubes were selected and prepared as described above. Adhesive was applied to the male portion and primer composition D was applied to the female portion. The tubes were mated with an overlap of about 0.75 inches, positioned vertically for 72 hours and tested. Tensile strength was tested on an Instron tensile tester using a cross head speed of 0.2 in/min. Test results are summarized in Table 2 below.

TABLE 2

| adhesive | primer | tubing combination | Initial test | Burst test (psi max) | tensile strength (lb) |
|---|---|---|---|---|---|
| 640 | D | Al to Al | pass | 2427 | 504 |
| 640 | D | Al to Al | pass | 2482 | 475 |
| 640 | D | Al to Al | pass | 2427 | 334 |
| 640 | | Cu to Cu | pass | 3985 | 556 |
| 640 | D | Cu to Cu | pass | 4070 | 562 |
| 640 | D | Cu to Cu | pass | 3945 | 437 |

LOCTITE 640 available from Henkel Corporation, Rocky Hill, Connecticut.

As shown by the results in Table 2 assemblies bonded using LOCTITE 640 adhesive and toughened primer composition D passed the initial and burst tests and would be suitable for use in forming a high pressure connection. The test results show that an adhesive bond between metal substrates can be toughened by using the present toughened primer composition. The tensile strengths shown in Table 2 indicate that bonds made using an adhesive and toughened primer composition can be useful in bonding parts or assemblies other than fluid connections.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A primer composition consisting of a toughening agent component; a copper, chromium, manganese, iron, cobalt, nickel, or molybdenum activator component; and a reactive component.

2. The primer composition of claim 1 wherein the activator component is a copper compound.

3. The primer composition of claim 1 wherein the toughening agent component is a block copolymer.

4. The primer composition of claim 1 having liquid form.

5. The primer composition of claim 1 wherein the reactive component comprises a (meth)acrylate.

6. The primer composition of claim 1 wherein the reactive component is selected from the group consisting of a monofunctional (meth)acrylate, a poly-functional (meth)acrylate, a urethane acrylate, an acrylate of bisphenol A, a methacrylate of bisphenol A, and a glycidyl methacrylate of bisphenol A.

7. A primer composition consisting of a toughening agent component; a copper, chromium, manganese, iron, cobalt, nickel, or molybdenum activator component; a reactive component; and an amine co-activator component and/or a carrier component.

8. The primer composition of claim 7 wherein the amine co-activator compound is selected from the group consisting of tri-n-butylamine, dimethyl-p-toluidine, dimethyl-o-toluidine, diethyl-p-toluidine, 3,5-diethyl-1,2-dihydro-1-phenyl propylpyridine, and di-2-hydroxyethyl-p-toluidine.

9. A method of toughening an adhesive bond, comprising:
providing a first surface to be bonded;
depositing the primer composition of claim 1 on the first surface;
contacting the primer composition with a curable adhesive composition; and
exposing the adhesive composition to conditions appropriate to cure the adhesive composition so that the cured reaction products form a toughened adhesive bond;
wherein the toughened adhesive bond is less brittle than an adhesive bond formed by curing the curable adhesive composition on the surface without depositing the primer composition.

10. The method of claim 9 wherein the primer composition is applied as a liquid to the first surface.

11. The method of claim 9 wherein the curable adhesive composition is applied to a second surface to be bonded and the second surface with applied curable adhesive composition is contacted to the first surface with applied primer composition.

12. The method of claim 9 wherein the primer composition and the curable adhesive composition are both applied to the first surface to be bonded and a second surface is contacted to the first surface.

13. The method of claim 9 wherein the primer composition and the curable adhesive composition are mixed and the mixture is applied to the first surface to be bonded and a second surface is contacted to the first surface.

14. The method of claim 9 wherein the first surface to be bonded is aligned with a second surface to be bonded to form an interface between the first and second surfaces and the primer composition and the curable adhesive composition are applied to the interface.

15. The method of claim 9 wherein the surface is plastic.

16. A method of making a high pressure connection, the connection consisting essentially of a first tubular member, a second tubular member and cured reaction products of a radically curable composition, comprising:
providing the first tubular member having a female distal joint portion;
providing the second tubular member having a male distal joint portion;
applying the primer composition of claim 1 to one of the distal joint portions;
applying the curable composition to one of the distal joint portions;
sliding the second tubular member male distal joint portion into the first tubular member female distal joint portion; and
curing the curable composition to maintain the second tubular member male distal joint portion within the first tubular member female distal joint portion thereby forming the high pressure connection.

17. The method of claim 16 wherein the primer composition is applied to the female distal joint portion and the curable composition is applied to the male distal joint portion.

18. The method of claim 16 wherein the primer composition is applied to the female distal joint portion and the curable composition is applied to the female distal joint portion.

19. The method of claim 16 wherein the primer composition and the curable composition are applied to an interface between the female distal joint portion and the male distal joint portion.

20. A method of toughening an adhesive bond, comprising:
providing a first surface to be bonded;
depositing the primer composition of claim 2 on the first surface;
contacting the primer composition with a curable adhesive composition; and
exposing the adhesive composition to conditions appropriate to cure the adhesive composition so that the cured reaction products form a toughened adhesive bond;
wherein the toughened adhesive bond is less brittle than an adhesive bond formed by curing the curable adhesive composition on the surface without depositing the primer composition.

21. A method of making a high pressure connection, the connection consisting essentially of a first tubular member, a second tubular member and cured reaction products of a radically curable composition, comprising:
providing the first tubular member having a female distal joint portion;
providing the second tubular member having a male distal joint portion;
applying the primer composition of claim 7 to one of the distal joint portions;
applying the curable composition to one of the distal joint portions;
sliding the second tubular member male distal joint portion into the first tubular member female distal joint portion; and
curing the curable composition to maintain the second tubular member male distal joint portion within the first tubular member female distal joint portion thereby forming the high pressure connection.

\* \* \* \* \*